United States Patent [19]

Solc et al.

[11] Patent Number: 5,232,970

[45] Date of Patent: Aug. 3, 1993

[54] CERAMIC-FILLED THERMALLY-CONDUCTIVE-COMPOSITES CONTAINING FUSIBLE SEMI-CRYSTALLINE POLYAMIDE AND/OR POLYBENZOCYCLOBUTENES FOR USE IN MICROELECTRONIC APPLICATIONS

[75] Inventors: Jitka Solc, Midland, Mich.; Douglas G. Kleweno, Lake Jackson, Tex.

[73] Assignee: The Dow Chemical Company, Midland, Mich.

[21] Appl. No.: 821,277

[22] Filed: Jan. 10, 1992

Related U.S. Application Data

[63] Continuation of Ser. No. 575,926, Aug. 31, 1990, abandoned.

[51] Int. Cl.$^5$ .................. C08J 5/10; C08K 3/38; C08L 77/06
[52] U.S. Cl. .................. 524/404; 523/443; 523/445; 523/451; 523/468; 524/414; 524/433; 524/443
[58] Field of Search .............. 523/443, 445, 451, 468; 524/404, 414, 433, 443

[56] References Cited

U.S. PATENT DOCUMENTS

| | | | |
|---|---|---|---|
| 4,197,351 | 4/1980 | Rolles et al. | 428/402 |
| 4,269,757 | 5/1981 | Mine et al. | 528/39 |
| 4,420,602 | 12/1983 | Bonk et al. | 528/80 |
| 4,420,603 | 12/1983 | Nelb, II et al. | 528/80 |
| 4,420,612 | 12/1983 | Bonk et al. | 528/80 |
| 4,480,676 | 11/1984 | Solomon | 160/272 |
| 4,501,444 | 2/1985 | Dominguez | 292/342 |
| 4,528,366 | 7/1985 | Woo et al. | 528/422 |
| 4,536,533 | 8/1985 | Chen et al. | 524/161 |
| 4,562,280 | 12/1985 | Gilpin et al. | 560/103 |
| 4,570,011 | 2/1986 | So | 560/8 |
| 4,612,353 | 9/1986 | Andrews et al. | 525/432 |
| 4,618,592 | 10/1986 | Kuramoto et al. | 501/96 |
| 4,642,329 | 2/1987 | Kirchhoff et al. | 526/284 |
| 4,657,952 | 4/1987 | Kerschbaumer et al. | 523/351 |
| 4,689,252 | 8/1987 | Lebrun et a. | 427/228 |
| 4,708,996 | 11/1987 | Hoffman et al. | 525/530 |
| 4,724,260 | 2/1988 | Kirchhoff et al. | 546/112 |
| 4,751,323 | 6/1988 | Woo et al. | 528/422 |
| 4,789,712 | 12/1988 | Haffman et al. | 525/528 |
| 4,795,827 | 1/1989 | Bruza et al. | 564/329 |
| 4,798,761 | 1/1989 | Wykowski et al. | 428/272 |
| 4,822,930 | 4/1989 | Liu | 570/206 |
| 4,826,896 | 5/1989 | Procter | 523/445 |
| 4,826,997 | 5/1989 | Kirchhoff | 548/546 |
| 4,851,603 | 7/1989 | Quarderer et al. | 585/410 |
| 4,877,917 | 10/1989 | Farona et al. | 585/416 |
| 4,891,455 | 1/1990 | Liu | 570/206 |
| 4,894,414 | 1/1990 | Yang et al. | 525/66 |
| 4,921,889 | 5/1990 | Lausberg et al. | 523/400 |

FOREIGN PATENT DOCUMENTS

| | | | |
|---|---|---|---|
| 3525301 | 7/1985 | Fed. Rep. of Germany | 524/404 |
| 242817 | 2/1987 | Fed. Rep. of Germany | . |
| 1159457 | 4/1980 | Japan | 524/404 |
| 56-145605 | 11/1981 | Japan | 524/404 |
| 57-147572 | 9/1982 | Japan | 524/404 |
| 61-159457 | 7/1986 | Japan | 524/404 |
| 62-91539 | 4/1987 | Japan | . |
| 62-96538 | 5/1987 | Japan | . |
| 62-212462 | 9/1987 | Japan | 524/404 |
| 63-77924 | 4/1988 | Japan | . |
| 63-69505 | 6/1988 | Japan | . |
| 63-117754 | 2/1989 | Japan | . |

OTHER PUBLICATIONS

Chemical Abstracts, Thermally Conductive Resin Compositions, vol. 111, 1989, p. 62.

(List continued on next page.)

Primary Examiner—Paul R. Michl
Assistant Examiner—U. K. Rajguru

[57] ABSTRACT

A ceramic-filled thermally-conductive composite for use in microelectronic applications includes a substantially homogeneous mixture of a solidified polymeric material and an adamantine-structured ceramic filler, such as aluminum nitride or boron nitride, wherein the solidified polymeric material is substantially continuous. The solidified polymeric material may be a material containing a predominant amount of a fusible semi-crystalline polyamide having a melting point of greater than about 250° C. or a polybenzocyclobutene.

13 Claims, No Drawings

OTHER PUBLICATIONS

Bolt et al., Ceramic Fiber-Polymer Composites for Electronic Substrates, 1989, pp. 207-211.

Bujard, Thermal Conductivity of Boron Nitride Filled Epoxy Resins: Temperature Dependence and Influence of of Sample Preparation, 1988, pp. 41-49.

Bigg, Thermally Conductive Polymer Compositions, 1986, pp. 125-140.

Onder et al., A New Semicrystalline Reinforced Polyamide Engineering Thermoplastic, 1984, pp. 373-374.

Ott, Thermal Conductivity of Composite Materials, 1981, pp. 9-24.

Onder et al., New Thermoplastic Transparent Polyamides, 1981, pp. 883-884.

Chapin et al., Synthesis of Polyamides, Polyamide-imides and Polyimides From 4,4'Methylene Bis-(Isocyanato Benzene) vol. 21, #2, 1980 pp. 130-132.

Derwent Publication LTD, Heat resistant adhesive composition JA042298, 1977.

37-Plastics Manuf. Reactive resins filled with thermally conductive nitrides, DE3,525,301, 1987.

37-Plastics Manuf. Resin materials with improved electrically insulating property, JP63,307,748.

Derwent Publications LTD, Ceramic green sheet for piezoelectric boards, JP066717, 1986.

37-Ceramics, Ceramic green sheets, JP 62,223,056, 1986.

Derwent Publications LTD, Non-toxic aluminum and boron nitride filled resins, DE525201, 1985.

Nieberlein, Thermal Conductivity Enhancement of Epoxies by the Use of Fillers, 1978, pp. 172-176.

57-Ceramics, Manufacture of Aluminum Nitride Sintered Body, vol. 107, 1987, p. 377.

A-12-E4 Electrical, potting compounds, Resin Composition for sealing semiconductor, 311649.

Chemical Abstracts, Aluminum Nitride Compositions, vol. 104, 1986 p. 314.

A12-E7C Semicond. Device, resistor, Insulation paste used for assembling semiconductor, 417904.

38-Plastics Fabr., Uses, Epoxy resins containing metal nitrides for sealing electrical parts, vol. 111 1989, p. 91.

Polymer Applications, Heat Conductive Resin Composition for mould or adhesive, p. 24.

Polymer Applications, Filler for resin for electronic parts, 1989, p. 7.

A8-M9C Optical; thermal, Polymer-filler composites with improved thermal conductivity, 418329.

Derwent Publications LTD, Heat resistant adhesive, 1982, JP131215.

Derwent Publications LTD, Composite resin sheet containing organic polymer, 1984, JP049911.

38-Plastics Fab. Uses, Heat Conductive thermosetting adhesives, 1984, JP59,22,961.

Derwent Publications, Epoxy resin moulding materials, 1987, JP193926.

Chemical Abstracts, Epoxy resin molding materials for sealing electric and electronic parts, vol. 111, 1989, p. 84.

CERAMIC-FILLED THERMALLY-CONDUCTIVE-COMPOSITES CONTAINING FUSIBLE SEMI-CRYSTALLINE POLYAMIDE AND/OR POLYBENZOCYCLOBUTENES FOR USE IN MICROELECTRONIC APPLICATIONS

This is a continuation of application Ser. No. 07/575,926, filed Aug. 31, 1990, now abandoned.

This invention relates generally to ceramic-filled thermally-conductive composites for use in microelectronic applications and methods of making the same.

BACKGROUND OF THE INVENTION

Materials for electronic circuit encapsulants, heat sinks, and sealants and the like for the microelectronics industry are generally mixtures of solidified polymeric materials, ceramic fillers, and other minor ingredients. The purpose for such encapsulants or heat sinks is to provide effective heat removal from electronic integrated circuits as well as to protect the electronic circuits from moisture, mobile ion contaminants, and ultraviolet, visible, and alpha-particle radiation. Critical properties of encapsulating and heat sink materials include high strength, high thermal conductivity, low coefficients of thermal expansion, moisture resistance, good thermal shock resistance, flexibility, and good electrical properties, such as being highly electrically insulative.

Several types of polymeric materials for use in microelectronic encapsulation and the like have been taught in the past. However, dramatic size-reduction trends and faster circuits in the microelectronics industry have resulted in smaller devices and packages which unavoidably generate more heat per unit area of the device or package. Consequently, there is a great interest in improved compositions with properties to better meet the current and future needs of the microelectronics industry.

It is, therefore, a primary object of the present invention to provide thermally-conductive composites for microelectronic applications which have high strength, high thermal conductivity, low coefficients of thermal expansion, high moisture resistance, good thermal shock resistance, greater flexibility, and good electrical properties, such as electrical insulative properties, are easily manufactured, and may be used at elevated temperatures. It is another object of the present invention to provide methods for making such composites.

SUMMARY OF THE INVENTION

In accordance with the preferred embodiment of the invention, these and other objects and advantages are addressed as follows. A ceramic-filled thermally-conductive composite for use in microelectronic applications is disclosed which includes a homogeneous mixture of (a) a solidified polymeric material and (b) an adamantine-structured ceramic filler, wherein the solidified polymeric material is substantially continuous in the composite.

The solidified polymeric material may be a modified epoxy resin prepared from an epoxy composition which includes a homogeneous mixture of from about 40 to about 85 parts by weight of an unmodified epoxy resin selected from the group consisting of cresol epoxy novolac resins, bisphenol-A-based epoxy resins, and phenol epoxy novolac resins, from about 10 to about 50 parts by weight of diglycidylether of bisphenol-A, and from about 5 to about 20 parts by weight of a dispersed polymer which is insoluble in diglycidylether of bisphenol-A, wherein the total parts by weight equal 100 parts. The solidified polymeric material may also be a material containing a predominant amount of a polymer selected from the group consisting of a polycyanate, a fusible semi-crystalline polyamide having a melting point greater than about 250° C., and a polybenzocyclobutene. The adamantine-structured ceramic filler may be diamond, boron nitride, silicon carbide, beryllium oxide, boron phosphide, aluminum nitride, beryllium sulfide, boron arsenide, gallium nitride, silicon, aluminum phosphide, gallium phosphide, and mixtures thereof.

For cases when the solidified polymeric material is a thermoplastic polymer, a unique method for making the thermally-conductive composite is disclosed. The method includes dry blending from about 10 to about 80 parts by volume of a thermoplastic polymer in powder form with from about 20 to about 90 parts by volume of a ceramic filler, wherein the total parts by volume of the thermoplastic polymer and the ceramic filler equal 100 parts. The dry blending is performed at a temperature lower than the melting point of the thermoplastic polymer and continued until the ceramic filler is substantially uniformly dispersed in the thermoplastic polymer.

DETAILED DESCRIPTION OF THE INVENTION

The present invention entails ceramic-filled thermally-conductive composites for use in microelectronic applications which include a mixture of a solidified polymeric material and an adamantine-structured ceramic filler. Key properties of a composite for microelectronic applications include high thermal conductivity, low coefficient of linear thermal expansion, high glass transition temperature, and low dielectric constant. Preferably, the composite of this invention has a thermal conductivity from about 0.8 to about 10 Watts/m°K. at 30° C., a coefficient of linear thermal expansion from about 10 to about 28 microns/m°C., and, more preferably, from about 12 to about 22 microns/m°C., as measured at a temperature below the glass transition temperature of the composite, a glass transition temperature of at least 150° C., and a dielectric constant from about 3 to about 8 measured at 1 kHz.

To achieve the above-described properties, the thermally-conductive composite contains the solidified polymeric material in an amount up to about 80 parts by volume and the ceramic filler in an amount at least about 20 parts by volume, wherein the total parts by volume of the solidified polymeric material and the ceramic filler equal 100 parts. More desirably, the composite contains the solidified polymeric material in an amount up to about 65 parts by volume and the ceramic filler in an amount at least about 35 parts by volume. Most desirably, the composite contains the solidified polymeric material in an amount from about 15 to about 45 parts by volume and the ceramic filler in an amount from about 55 to about 85 parts by volume.

As mentioned, the ceramic filler has an adamantine structure and is selected from the group consisting of diamond, boron nitride, silicon carbide, beryllium oxide, boron phosphide, aluminum nitride, beryllium sulfide, boron arsenide, gallium nitride, silicon, aluminum phosphide, gallium phosphide, and mixtures thereof. The ceramic filler may be blended with non-adamantine structured fillers. Preferably, the particle size of the ceramic filler is from about 0.1 to about 100 microns, and more preferably, from about 0.2 to about 20 microns when the particle size distribution is monomodal. Ceramic fillers having multimodal particle size distributions have been found to be advantageous, which fact is known to the skilled artisan.

Further, to achieve the desired properties in the composite, the solidified polymeric material selected advantageously has a thermal conductivity from about 0.15 to about 0.5 Watts/m°K. at 30° C., and a glass transition temperature of at least about 150° C.

Certain polymeric materials have been found to possess such properties and other properties which are especially suitable for making the thermally-conductive composites of this invention. These polymeric materials include a modified epoxy resin prepared from an epoxy composition which includes a homogeneous mixture of from about 40 to about 85 parts by weight of an unmodified epoxy resin selected from the group consisting of cresol epoxy novolac resins, bisphenol-A-based epoxy resins, and phenol epoxy novolac resins, from about 10 to about 50 parts by weight of diglycidylether of bisphenol-A, and from about 5 to about 20 parts by weight of a dispersed polymer which is insoluble in diglycidylether of bisphenol-A, wherein the total parts by weight equal 100 parts. Other polymeric materials include those which contain a predominant amount of polycyanate, a fusible semi-crystalline polyamide having a melting point of greater than about 250° C., or polybenzocyclobutene.

Unmodified epoxy resins useful in the epoxy compositions described above include cresol epoxy novolac resins which preferably have epoxide equivalent weights (EEW's) from about 180 to about 230 and Viscosities at 150° C. of from about 175 to about 2800 cSt. Commercial examples of such cresol epoxy novolac resins include "QUATREX" 3310, 3330, 3410, 3430, 3450, 3710, and 3910. Another suitable type of unmodified epoxy resins include bisphenol-A-based epoxy resins which preferably have epoxide equivalent weights from about 180 to about 575. Commercial examples of such bisphenol-A-based epoxy resins include "QUATREX" 1010 and 1410. A third suitable type of unmodified epoxy resins include phenol epoxy novolac resins which preferably have epoxide equivalent weights from about 175 to about 220. Commercial examples of such phenol epoxy novolac resins include "QUATREX" 2010, 2410, and 2710. The "QUATREX" resins are available from The Dow Chemical Company, Midland, Michigan, owner of the trademark "QUATREX".

A commercial source for the diglycidylether of bisphenol-A which is used in the epoxy composition is "TACTIX" 123 Liquid Epoxy Resin, available from The Dow Chemical Company, owner of the trademark "TACTIX". "TACTIX" 123 Liquid Epoxy Resin has an epoxide equivalent weight of from about 172 to about 176 with a viscosity at 25° C. of from about 4400 to about 5600 cps.

Preferably, the dispersed polymer used in the epoxy composition is used in the form of a dispersion which is stable at a temperature above 60° C. Preferably, the dispersed polymer is an organic polymer which is the polymerizate of at least one ethylenically unsaturated monomer. Such dispersed polymers and dispersions and their methods of making are disclosed in commonly-owned U.S. Pat. Nos. 4,708,996 and 4,789,712, which patents are hereby incorporated by reference. A preferred dispersion of a dispersed polymer for the invention is a dispersion of poly(2-ethylhexylacrylate-co-glycidyl methacrylate)(94/6) in diglycidylether of bisphenol-A.

The epoxy compositions can contain a curing quantity of any suitable curing agent for epoxy resins. Suitable such curing agents include, for example, primary and secondary polyamines, carboxylic acids and anhydrides thereof, phenolic hydroxyl-containing compounds, guanidines, biguanides, urea-aldehyde resins, melamine-aldehyde resins, alkoxylated urea-aldehyde resins, alkoxylated melamine-aldehyde resins, amides, sulfones, sulfonamides, combinations thereof and the like. Particularly suitable curing agents include, for example, phenol-formaldehyde novolac resins, cresol-formaldehyde novolac resins, dicyclopentadiene-phenol resins, dicyclopentadiene-cresol resins, bis-(4-aminophenyl)sulfone, aminophenyl sulfonamide, dicyandiamide, phenylenediamine, phthalic anhydride, combinations thereof and the like.

The curing agents are employed in an amount which will effectively cure the epoxy composition. These amounts will depend upon the particular ingredients and curing agent employed; however, suitable amounts include, for example, from about 0.5 to about 2.0, more suitably from about 0.7 to about 1.5, most suitably from about 0.9 to about 1.2 equivalents of curing agent per epoxide equivalent for those curing agents which cure by reacting with epoxy groups or per hydroxyl group for those curing agents which cure by reacting with aliphatic hydroxyl groups. The *Handbook of Epoxy Resins* by Lee and Neville, McGraw-Hill, 1967, contains various discussions concerning the curing of epoxy resins as well as a compilation of suitable curing agents. This handbook is incorporated herein by reference.

If desired, other components or additives can be included in the epoxy composition used in the present invention, such as, for example, pigments, dyes, fillers, wetting agents, stabilizers, mold release agents, flow control agents, fire retardant agents, surfactants, combinations thereof and the like.

These additives are added in functionally equivalent amounts. For example, the pigments and/or dyes are added in quantities which will provide the composition with the desired color; however, they are suitably employed in amounts of from about zero to about 20, more suitably from about 0.05 to about 5, most suitably from about 0.5 to about 3 percent by weight based upon the weight of total composition.

The epoxy compositions used in the present invention can also, if desired, contain reinforcing materials in the form of mats, woven fabric, unidirectional fibers, rovings, random fibers or filaments, inorganic fillers, inorganic whiskers, hollow spheres, ceramics, and the like. These reinforcing materials can be prepared from glass fibers, aramid fibers, graphite fibers, and polymer fibers such as nylon, polyalkylene terephthalate, polyethylene, polypropylene, polyesters, combinations thereof and the like.

To use the epoxy compositions in this invention, the epoxy composition ingredients may be malt mixed with the ceramic filler at any temperature which facilitates adequate mixing, for example, at temperature of from about 70° C. to about 250°0 C., more suitably from about 80° C. to about 200° C., and most suitably from about 90° C. to about 150° C. Any suitable blending means for preparing the composites of the present invention can be employed, such as, for example, kneaders, static mixers, extruders, roll mills, agitators, combinations thereof and the like. After melt-mixing, the composite material may be hardened by cooling, then ground to a powder. The composite powder is then typically cured into the desired form, e.g., at 175° C. for about 4 hours.

The modified epoxy resins have the advantage that they have a greater flexibility and can withstand temperature cycling and thermal shocks to a greater extent than epoxy resins currently used in microelectronic composites.

Polycyanates suitable as the polymeric material used in the invention typically have a glass transition temperature greater than 225° C. A preferred structure of polycyanate is based on dicyclopentadienyl cyanate having the structure:

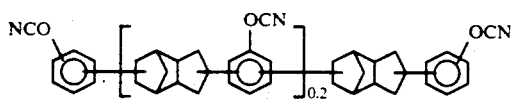

U.S. Pat. Nos. 4,528,366 and 4,894,414 and, in particular, U.S. Pat. No. 4,751,323, which patents are hereby incorporated by reference, teach how to make polycyanates suitable for this invention.

The cyanates used to form the polycyanates employable in this invention cure by addition polymerization using common organometallic or non-metallic catalysts. One especially suitable cyanate is XU71787 Cyanate Resin available from The Dow Chemical Company, Midland, Michigan. With this cyanate resin, it is preferred to catalyze with cobalt (III) acetylacetonate or cobalt (III) octoate at levels of 100–300 parts per million based on the metal ion. Other catalysts for this and other cyanates useful for the invention include triethylenediamine, pyrogallol, quinuclidine, triethylenediamine in combination with pyrogallol or salicylic acid, iron (III) naphthenate, iron (III) octoate, iron (III) acetylacetonate, zinc (II) naphthenate, zinc (II) octoate, and cobalt (III) naphthenate. A typical cure schedule for the XU71787 Cyanate Resin is 3 hours at 177° C. plus 2 hours at 232° C.

To form and use polycyanate in this invention, the cyanate resin may first be de-gassed in a vacuum oven at a temperature of about 110°–120° C. then a suitable catalyst may be admixed into the de-gassed cyanate resin. Ceramic filler, preheated to about 100° C., may then be quickly admixed into the catalyzed cyanate resin. The resulting mixture may then be transferred to a preheated mold and cured for 1 hour at 175° C., followed by 2 hours at 225° C. The cured solid composite may then be machined into specimens of desired structure.

The polyamides useful in this invention are fusible semi-crystalline polyamides having a melting point of greater than about 250° C. The term "fusible" is meant to mean that the polymeric material will melt at an elevated temperature and w.11re-solidify upon cooling. Such semi-crystalline polyamides are prepared by heat or solution polymerization. Synthesis of such polyamides from commercial diisocyanates has been described in articles by A. Onder et al., one published in ACS Polymer Preprint, volume 21, number 2, August 1980, pages 130 and 132, and the other published in the 39th Annual S.P.E. A.N.T.E.C., 1981, page 883. In addition, methods for making such polyamides are taught in U.S. Pat. Nos. 4,420,602, 4,420,603, 4,501,444, 4,536,533, and 4,612,353, which patents are hereby incorporated by reference. The semi-crystalline polyamides are preferably polymerized from a combination selected from the group consisting of (a) p, p'-diphenylmethane diisocyanate and azelaic acid and (b) p, p'-diphenylmethane diamine and azelaic acid. The polyamide prepared from the diisocyanate and azelaic acid are generally preferred in that they are less brittle than the ones prepared from the diamine and the azelaic acid. The polyamide prepared from the diisocyanate and azelaic acid has a melting point greater than about 250° C., a glass transition temperature greater than about 100° C., and the following structure:

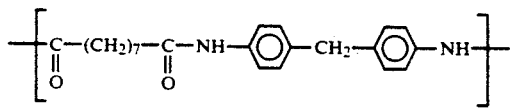

Such polyamides have good creep resistance, good dry-heat aging, good U.V. resistance, low flammability, lower water absorbency than conventional nylon, and controllable molecular weight The semi-crystalline polyamides used in this invention have advantages over the other polymeric materials suitable for this invention in that they are thermoplastic making them easier to mold, more adaptable for making larger molded pieces, and easily applied to surfaces, such as epoxy structures Particularly, a powder composite using the semi-crystalline polyamides may be laminated onto epoxy electronic circuit boards by merely sprinkling the powder composite onto the circuit board and heating to spread and cure the polyamide in place. Additionally, using the semi-crystalline polyamides suitable for this invention result in a composite having a higher thermal conductivity due to the crystallinity of the polymeric material.

With the thermoplastic polymer, it was found that the common melt-compounding technique used for other polymeric materials was difficult and inefficient to use. Therefore, a special technique was developed for blending the thermoplastic polymer with the ceramic filler. The method includes dry blending from about 10 to about 80 parts by volume of the thermoplastic polymer in powder form with from about 20 to about 90 parts by volume of a ceramic filler, wherein the total parts by volume of the thermoplastic polymer and the ceramic filler equal 100 parts. The dry blending is continued until the ceramic filler is substantially uniformly dispersed in the thermoplastic polymer. By "dry blending", it is meant that the blending is performed without solvent present and at a temperature lower than the melting point of the thermoplastic polymer. Preferably, the dry blending is performed at ambient temperature, e.g., about 20 to about 30° C., exposed only to heat generated by mixing. Typically the dry blending is performed in a ball mill filled with milling media.

During the dry blending, semi-crystalline polyamide has a tendency to assume a positive tribocharge, and an inorganic ceramic filler, e.g., aluminum nitride, boron nitride, or fused silica, has a tendency to assume a negative tribocharge. These opposing tribocharges result in a more uniform mixture and a more efficient mixing process. If the ingredients are heated substantially during the dry blending, the tribocharges will diminish and mixing will not be as efficient.

Once a substantially uniform dispersion of the thermoplastic polymer and the ceramic filler is formed, an article may be made by placing the dispersion into the desired mold and thereafter heating and/or pressurizing the dispersion into an article.

Polybenzocyclobutenes suitable for this invention are disclosed in U.S. Pat. Nos. 4,562,280, 4,570,011, 4,642,329, 4,724,260, 4,795,827, 4,822,930, 4,826,997, 4,851,603, 4,877,917, and 4,891,455, which patents are hereby incorporated by reference. Generally, monomers for polybenzocyclobutenes, i.e., the benzocyclobutenes, will cross-link upon heating to about 50° C. without any other additives. The resulting polybenzocyclobutene has a very high cross-link density, usually less than monomer between cross-links. Polybenzocyclobutenes based on the monomer, di(vinylbenzocyclobutenyl) tetramethyldisiloxane having the following structure:

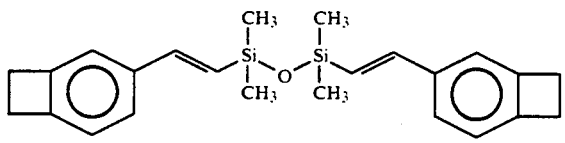

or the monomer, isophthaloyldibenzocyclobutene, having the following structure:

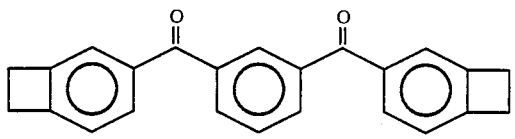

have been found particularly suitable for this invention.

The di(vinylbenzocyclobutenyl) tetramethyldisiloxane is the preferred monomer as it has a lower viscosity, thus allowing easier processing and higher filler loadings. To blend the ceramic filler with the isophthaloyldibenzocyclobutene monomer, the monomer must be melted and the ceramic filler mixed therein at an elevated temperature.

To use the benzocyclobutenes for electronic encapsulation, once the benzocyclobutene and the ceramic filler are blended, the blend may be applied to electronic circuits and the like and cured at temperatures above about 150° C. The polybenzocyclobutenes provide many advantages relative to other solidified polymeric materials due to the fact that they have high temperature capabilities, are hydrophobic, have low dielectric constants, are easy to process, and are versatile in that other functional groups may be introduced in the monomer structure as needed.

The present invention also includes a unique blend of ceramic fillers which results in a surprisingly good thermally-conductive composite which has balanced thermal conductivity and dielectric properties. The blend of ceramic fillers consists of a mixture of fused silica and adamantine-structured ceramic filler, wherein the ceramic fillers are present in a ratio of from about 0.25:4 to about 4:0.25 weight parts fused silica to weight parts of adamantine-structured ceramic filler. Preferably, the ceramic fillers are present in a ratio of from about 2:3 to about 3:2 weight parts fused silica to weight parts adamantine-structured ceramic filler. Mixtures of the unsolidified polymeric material and this unique blend of ceramic fillers were also found to have lower viscosities than employing strictly adamantine-structured ceramic fillers, resulting in easier processing.

Thus, there is provided, in accordance with the present invention, composites and methods for making composites which have high strength, high thermal conductivity, low coefficients of thermal expansion, high moisture resistance, good thermal shock resistance, greater flexibility, and good electric properties, such as electrical insulative properties, are easily manufactured, and may be used at high temperatures.

The test methods and materials described hereinbelow were used in the following examples. "ND" used in the tables means "not determined", and "N/A" means "not applicable".

Thermal Conductivity Measurements via the Laser Flash Method

Thermal conductivity measurements determined by the Laser Flash Method were determined using a method based on ASTM-C714-72 performed at room temperature. With this method, specimen disks measuring about 12 mm in diameter and 3 mm thick were mounted to a holder which exposed the front face of the disks to an optical pulse from a Nd: YAG laser. The disks were coated with a thin carbon film which facilitated the absorption of the laser pulse and its conversion to heat. The heat traveled through each disk and was radiated from its rear surface. An infrared detector collected the radiations an outputted a signal. The signal was fit by computer to a model which gave the thermal diffusivity of the disk. The thermal diffusivity was converted to thermal conductivity by calculations which included the specimen density and specific heat.

Thermal Conductivity Measurements via the Transient Hot Strip Method

Thermal conductivities determined by the Transient Hot Strip Method were determined following the procedure described in J. J. DeGroot, et al., Physica 76, 454–482 (1974) with the exceptions that (1) instead of testing liquids using a hot wire, solids were tested using a hot strip, specifically, a thin platinum foil, and (2) the equations were modified for the geometrical factors of going from a wire to a strip.

Measurement of Coefficient of Linear Thermal Expansion and Glass Transition Temperature To determine the coefficients of linear thermal expansion and glass transition temperatures of the samples, ASTM-E831-86 was employed using a DuPont thermomechanical analyzer, Instrument 943, available from E. I. DuPont De Numours and Company., Inc., Wilmington, Delaware.

Measurement of Dielectric Constant

The room temperature measurements of dielectric constant in the 1 kHz to 1 MHz frequency region were made using a Hewlett Packard 4284 LCR meter in a two-point cell in accordance with ASTM D-150.

The Ceramic Fillers

Tables 1 and 2 provide information regarding the ceramic fillers used in the examples. For each type of ceramic filler, there is a filler type code which is referred to in the following examples.

TABLE 1

| Filler Type Code | Average Surface Area (m²/g) | Median Agglomerate Size (Microns) | Crystalline Size Range (Microns) |
|---|---|---|---|
| AlN #1 | 1.0 | 3.7 | 2-6 |
| AlN #2 | 3.0 | 2.5 | 0.3-0.8 |
| AlN #3 | 1.1 | N/D | N/D |

For AlN#3, the maximum particle size which included 75 volume percent of the particles was 2.8 microns, the maximum particle size which included 25 volume percent of the particles was 1.8 microns, and the median particle size was 1.9 microns.

"UCAR" boron nitride powders, available from Union Carbide Corporation, Cleveland, Ohio, were used as ceramic fillers in some of the following examples. "UCAR" is a trademark of the Union Carbide Corporation. Properties of the "UCAR" boron nitride powders may be found in Table 2. In addition, in the following examples "FS" refers to fused silica GP-71, supplied by Harbison-Walter Refractories Division of Dresser Industries, Inc., Calhoun, Georgia.

TABLE 2

| Filler Type Code | BN #1 | BN #2 |
|---|---|---|
| Typical Surface area (m²/g) | 4 | 5 |
| Screen analysis | 0% on 48 mesh; 90% min. through 48 on 200 mesh | 0.5% max. on 200 mesh; 94.5% min. through 200 on 325 mesh |

The following examples are illustrative only and should not be construed as limiting the invention which is properly delineated in the appended claims.

Examples

Examples 1-2

These examples provide examples of using the modified epoxy resin in the invention. Table 3 lists the product names and the sources of the ingredients used in the examples. The compositions of Examples 1 and 2 are provided in Table 4.

TABLE 3

| Ingredient | Product Name | Source |
|---|---|---|
| Epoxy Portion | N/A[a] | N/A |
| Curing Agent | HRJ 2210[b] | Schenectady Chemicals. Schenectady, NY |
| Mold Release | Wax E[c] | American Hoechst Corp., Somerville, NY |
| Catalyst | Triphenylphosphine | Aldrich Chemical Co. Milwaukee, WI |

[a] The epoxy portion was prepared by first blending 67.5 wt % "QUATREX" 3710, 7.5 wt % "TACTIX" 123, and 25.0 wt % of a 40 wt % dispersion of poly(2-ethylhexylacrylate-co-glycidylmethacrylate) in the diglycidylether of bisphenol-A having an EEW of from about 280 to about 300. The weight average molecular weight of the poly(2-ethylhexylacrylate-co-glycidyl methacrylate) was about 46,000. "QUATREX" 3710 is a cresol epoxy novolac resin available from the Dow Chemical Company, having an EEW of about 205.4, a viscosity of about 850-1300 cSt. at 150° C., a softening point of about 75-95° C., about 800-1200 ppm total chlorides, and about 40 ppm hydrolyzable chlorides. "TACTIX" 123 has been previously herein described.

[b] HRJ 2210 (Hydroxyl equivalent weight = 104) is a solid phenol-formaldehyde novolac resin having an average hydroxyl functionality of approximately 6 per molecule.

[c] Wax E consists of esters of montanic acids with ethylene glycol.

TABLE 4

| Ingredient | Ex. 1 | Ex. 2 |
|---|---|---|
| Epoxy Portion (g) | 29.1 | 38.5 |
| Curing Agent (g) | 15.5 | 20.6 |
| Catalyst (g) | 0.3 | 0.4 |
| Mold Release (g) | 0.6 | 0.8 |
| AlN-#1 (g) | 155 | 98 |
| AlN-#2 (g) | 0 | 42 |

The ingredients in these examples were well-mixed in a plastic container. The mixture was then melt-blended on a two-roll hot mill for 7-8 minutes. One roll of the hot roll was heated to 65° C. and rotated clockwise at about 35 rpm's, while the other roll was heated to 90°-95° C. and rotated counterclockwise at about 25 rpm's. The compounded material was then cut from the two-roll mill and placed on a flat aluminum sheet. After the compounded material hardened and reached room temperature, the compounded material was ground to about 10 mesh diameter powder. The powder was then transfer molded into test bars at 175° C. for about 2 minutes. The test bars were then post-cured at 175° C. for an additional 4 hours. The test bars were cut to proper dimensions for testing using a precision diamond saw.

Table 5 provides the thermal conductivity as measured using the Transient Hot Strip Method, the glass transition temperature, the coefficient of linear thermal expansion as measured below the glass transition temperature, and the modulus of the composites of Examples 1 and 2.

TABLE 5

| Example # | K. at 30° C. (Watts/m °K.) | Tg (°C.) | $C_LTE$ below Tg (microns/m °C.) | Modulus (GPa) |
|---|---|---|---|---|
| 1 | 1.81 | 149 | 20 | 10.05 |
| 2 | 1.41 | 164 | 26.6 | 10.10 |

Examples 3-4

Example 3 illustrates the use of a polycyanate resin used in the composite. Example 4 is provided to show properties of the polycyanate resin alone. The polycyanate used was based on XU71787 Cyanate Resin, available from The Dow Chemical Co., Midland, Mich., a dicyclopentadienylcyanate having the structure:

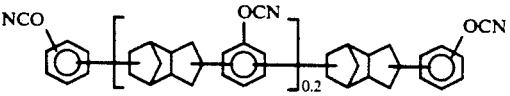

and had a glass transition temperature of about 265° C. XU71787 Cyanate Resin has an uncured viscosity of about 2500 to 5500 centipoise at 70° C. Typical properties of cured XU71787 Cyanate Resin include: a coefficient of thermal expansion of about 62 micron-inch/°C., a $G_{IC}$ of about 1.03 inch-pound/inch², a tensile strength at room temperature of about 10.1 Ksi, a tensile modulus at room temperature of about 470 Ksi, a tensile elongation at room temperature of about 2.70%, a flexural strength at room temperature of about 18.3 Ksi, a flexural modulus at room temperature of about 490 Ksi, a flexural elongation at room temperature of about 3.60%, a dielectric constant of about 2.8 at 1 MHz, and a dissipation factor of about 0.0020 at 1 MHz.

Table 6 provides the composition of examples 3A through 3B. As two test bars were needed for each composition for property testing, each example has a part A and part B each representing a test bar. Parts A and B had essentially the same composition for each example. For Examples 3A and 3B, the filler used was a 70:30 weight ratio mixture of AlN#1 to AlN#2.

TABLE 6

| Example # | Amount of Resin (g) | Amount of Catalyst (cm³) | Amount of Filler (g) |
|---|---|---|---|
| 3A | 20 | 0.25 | 42.7 |
| 3B | 20 | 0.25 | 46.2 |
| 4A | 80 | 1 | 0 |
| 4B | 80 | 1 | 0 |

For each test bar of Example 3, the aluminum nitride powder and the mold were first preheated to approximately 130° C. in a convection oven. The amount of the XU71787 Cyanate Resin needed for a specific sample was de-gassed in a vacuum oven at approximately 120° C. for 20 minutes. Cobalt acetylacetonate catalyst was added to bring the total cobalt level to about 200 ppm based on the cyanate resin. The preheated aluminum nitride powder was then quickly hand-admixed into the catalyzed resin. The resulting mixture was transferred into the preheated mold and cured one hour at 175° C., followed by two hours at 225° C. The solid composite sample was machined into test bars of required dimensions. Table 7 provides the properties as measured on the test bars of these examples. The thermal conductivities of the composite and the neat polycyanate were determined by the Transient Hot Strip Method.

TABLE 7

| Example # | K. at 30° C. (Watts/m °K.) | $C_LTE$ below $T_g$ (microns/m °C.) | $T_g$ (°C.) |
|---|---|---|---|
| 3 | 1.52 | 18.8 | 238 |
| 4 | 0.24 | 59.9 | 244 |

Examples 5-8

Examples 5-7 illustrate the use of a semi-crystalline polyamide in the invention. Example 8 is provided to show the properties of the semi-crystalline polyamide alone. The semi-crystalline polyamide used in these examples was XU-72100 Polyamide, available from The Dow Chemical Company, Midland, Mich. XU-72100 Polyamide had a melting point of 290° C., a glass transition temperature of 135° C., a tensile strength of about 10,300 psi, a tensile modulus of 244,000 psi, and an elongation of about 5%, a flexural strength of 7,500 psi, and a flexural modulus of about 357,000 psi, and the following structure:

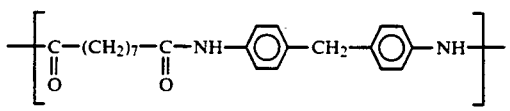

XU-72100 polyamide and the ceramic filler were mixed, according to the amounts provided in Table 8, with ceramic zirconium cylinders measuring 13×13 millimeters in a jar and placed on a two-roll mill for 8 hours. The compounded powder was then separated from the zirconium cylinders. Scanning electron micrographs of the compounded powder indicated a very uniform coverage of the filler by the polymer. The compounded powders were transfer-molded into the required forms for testing. The molding was performed at 315° C. The properties of the various compositions are provided in Table 9. The thermal conductivities were measured using the Laser Flash Method.

TABLE 8

| Example # | Filler Type | Wt % Filler in Composition |
|---|---|---|
| 5 | 50 wt % Aln #2/ 50 wt % Aln #3 | 73 |
| 6 | BN #2 | 73 |
| 7 | 70 wt % BN #2/ 30 wt % BN #1 | 73 |
| 8 | None | 0 |

TABLE 9

| Example # | K. at 30° C. (Watts/m °K.) | $C_LTE$ below $T_g$ (microns/m °C.) | Dielectric Constant at 1 kHz |
|---|---|---|---|
| 5 | 4.13 | 26.4 | 5.84 |
| 6 | 2.3 | ND | ND |
| 7 | 3.84 | ND | ND |
| 8 | 0.335 | 73 | 3.90 |

Examples 9-11

Examples 9 and 10 illustrate the use of polybenzocyclobutene as the polymeric material in the invention. Example 11 is provided to show the properties of the polybenzocyclobutene alone. The benzocyclobutene monomer used in these examples was di(vinylbenzocyclobutenyl) tetramethyldisiloxane. The monomer and the ceramic filler were blended at room temperature in the amounts provided in Table 10. The blend was then placed in a press mold for forming the test bars and the monomer was polymerized by heating the mold to about 200° C. and maintaining the temperature at 200° C. for two hours, then increasing the mold temperature to 240° C. and maintaining that temperature for two hours, and, finally, increasing the mold temperature to 270° C. and maintaining that temperature for two hours. The composite was allowed to cool for 10-12 hours before property testing. The thermal conductivities of the test bars, as measured using the Laser Flash Method, and other properties are provided in Table 11.

TABLE 10

| Example # | Filler Types | Wt Ratio of Fillers | Wt % Of Filler |
|---|---|---|---|
| 9 | FS/AlN #1/ AlN #2 | 50/35/15 | 73 |
| 10 | AlN #1/ AlN #2 | 70/30 | 73 |
| 11 | None | N/A | N/A |

TABLE 11

| Example # | K. at 30° C. Watts/m °K. | $C_LTE$ below $T_g$ (microns/m °C.) | Dielectric Constant at 1 kHz |
|---|---|---|---|
| 9 | 1.44 | 15.3 | 3.9 |
| 10 | 2.78 | 11.0 | 4.97 |
| 11 | 0.4 | 66.6 | 2.63 |

While our invention has been described in terms of a few specific embodiments, it will be appreciated that other embodiments could readily be adapted by one skilled in the art. Accordingly, the scope of our invention is to be considered limited only by the following claims.

We claim:

1. A ceramic-filled thermally-conductive composite for use in microelectronic applications, comprising a substantially homogeneous mixture of:
   (A) a fusible semi-crystalline polyamide having a melting point of greater than about 250° C. and polymerized from a combination selected from the group consisting of (I) p, p'-diphenylmethane diisocyanate and azelaic acid and (II) p, p'-diphenylmethane diamine and azelaic acid present in an amount up to about 65 parts by volume; and
   (B) an adamantine-structured ceramic filler selected from the group consisting of diamond, boron nitride, silicon carbide, beryllium oxide, boron phosphide, aluminum nitride, beryllium sulfide, boron arsenide, gallium nitride, silicon, aluminum phosphide, gallium phosphide, and mixtures thereof, the ceramic filler present in an amount at least about 35 parts by volume wherein the total parts by volume of the fusible semi-crystalline polyamide and the ceramic filler equal 100 parts, wherein the solidified polymeric material is substantially continuous.

2. The thermally-conductive composite of claim 1, wherein the polymer is a fusible semi-crystalline polyamide having a melting point greater than about 250° C., a glass transition temperature greater than about 100° C., and the following structure:

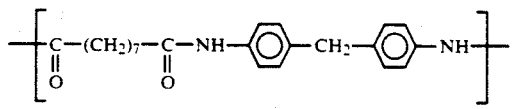

3. The thermally-conductive composite of claim 1, wherein the mixture further includes fused silica present in a ratio of from about 0.25:4 to about 4:0.25 weight parts fused silica to weight parts of the adamantine-structured ceramic filler.

4. The thermally-conductive composite of claim 1, wherein the solidified polymeric material is present in an amount from about 15 to about 45 parts by volume and the ceramic filler is present in an amount from about 55 to about 85 parts by volume wherein the total parts by volume of the solidified polymeric material and the ceramic filler equal 100 parts.

5. The thermally-conductive composite of claim 1, wherein the thermally-conductive composite has a thermal conductivity from about 0.8 to about 10 Watts/m°K. at 30° C.

6. The thermally-conductive composite of claim 1, wherein the thermally-conductive composite has a coefficient of linear thermal expansion from about 10 to about 28 microns/m°C. as measured at a temperature below the glass transition temperature of the thermally-conductive composite.

7. The thermally-conductive composite of claim 1, wherein the thermally-conductive composite has a coefficient of linear thermal expansion from about 12 to about 22 microns/m°C. as measured at a temperature below the glass transition temperature of the thermally-conductive composite.

8. The thermally-conductive composite of claim 1, wherein the thermally-conductive composite has a glass transition temperature of at least 150° C.

9. The thermally-conductive composite of claim 1, wherein the thermally-conductive composite has a dielectric constant from about 3 to about 8 at 1 kHz.

10. The thermally-conductive composite of claim 1, wherein the solidified polymeric material has a thermal conductivity from about 0.15 to about 0.5 Watts/m°K. at 30° C.

11. The thermally-conductive composite of claim 1, wherein the solidified polymeric material has a glass transition temperature of at least about 150° C.

12. A ceramic-filled thermally-conductive composite for use in microelectronic applications, comprising a substantially homogeneous mixture of:
   (A) a polybenzocyclobutene present in an amount up to about 65 parts by volume and
   (B) an adamantine-structured ceramic filler selected from the group consisting of diamond, boron nitride, silicon carbide, beryllium oxide, boron phosphide, aluminum nitride, beryllium sulfide, boron arsenide, gallium nitride, silicon, aluminum phosphide, gallium phosphide, and mixtures thereof, the ceramic filler present in an amount at least about 35 parts by volume wherein the total parts by volume of the polybenzocyclobutene and the ceramic filler equal 100 parts, wherein the polybenzocyclobutene is substantially continuous.

13. The thermally-conductive composite of claim 12, wherein the polymer is a polybenzcyclobutene based on a monomer selected from the group consisting of di(-vinylbenzocyclobutenyl) tetramethyldisiloxane and isophthaloyldibenzocyclobutene.

* * * * *

UNITED STATES PATENT AND TRADEMARK OFFICE
CERTIFICATE OF CORRECTION

PATENT NO. : 5,232,970
DATED : August 3, 1993
INVENTOR(S) : Jitka Soc

It is certified that error appears in the above-indentified patent and that said Letters Patent is hereby corrected as shown below:

Title page, item [75], inventor:  should read -- Jitka Solc, Midland, Mich.-

Signed and Sealed this

Twentieth Day of September, 1994

Attest:

BRUCE LEHMAN

Attesting Officer

Commissioner of Patents and Trademarks